United States Patent
Okabe (10) Patent No.: US 8,005,615 B2
(45) Date of Patent: Aug. 23, 2011

(54) NAVIGATION SYSTEM

(75) Inventor: Hidefumi Okabe, Okazaki (JP)

(73) Assignee: Aisin AW Co., Ltd., Anjo-shi, Aichi (JP)

( * ) Notice: Subject to any disclaimer, the term of this patent is extended or adjusted under 35 U.S.C. 154(b) by 85 days.

(21) Appl. No.: 11/498,062

(22) Filed: Aug. 3, 2006

(65) Prior Publication Data

US 2007/0032943 A1    Feb. 8, 2007

(30) Foreign Application Priority Data

Aug. 5, 2005   (JP) ................. 2005-227783

(51) Int. Cl.
 G08G 1/16   (2006.01)
 B60T 7/12   (2006.01)
(52) U.S. Cl. ..................... 701/301; 701/96
(58) Field of Classification Search .......... 701/96, 701/200, 209, 213, 223; 340/902, 903, 435, 340/436, 988, 444, 441, 467, 465
See application file for complete search history.

(56) References Cited

U.S. PATENT DOCUMENTS

| | | | |
|---|---|---|---|
| 5,761,630 A * | 6/1998 | Sekine et al. ............... | 701/301 |
| 5,904,728 A | 5/1999 | Tamai et al. ................ | 701/211 |
| 6,253,153 B1 | 6/2001 | Kantani ...................... | 701/209 |
| 2002/0010543 A1 | 1/2002 | Watanabe et al. ............ | 701/211 |
| 2003/0187578 A1 * | 10/2003 | Nishira et al. .............. | 701/301 |
| 2004/0227647 A1 * | 11/2004 | Yanai ......................... | 340/995.1 |
| 2005/0015203 A1 * | 1/2005 | Nishira ....................... | 701/301 |
| 2006/0195258 A1 | 8/2006 | Kim ............................ | 701/211 |

FOREIGN PATENT DOCUMENTS

| | | |
|---|---|---|
| JP | 10-329738 | 12/1998 |
| JP | 11-053685 | 2/1999 |
| JP | 11-161895 | 6/1999 |
| JP | 11-311535 | 9/1999 |

* cited by examiner

Primary Examiner — Tuan C To
Assistant Examiner — Imran Mustafa
(74) Attorney, Agent, or Firm — Bacon & Thomas, PLLC (57) ABSTRACT

A navigation system includes data storage that contains map data, a current position detection portion that detects a current position of a host vehicle, an acceleration lane remaining distance determination portion that determines a distance from the current position to the end of an acceleration lane where it merges with a main thoroughfare, based on the map data and the current position of the host vehicle, a merging support guidance selection portion that selects a type of merging support guidance for supporting the merging of the host vehicle from the acceleration lane into the main thoroughfare, based on information for the host vehicle in the acceleration lane, information for another vehicle so located on the main thoroughfare as to be accounted for in merging, and the distance from the current position to the end of the acceleration lane, and a guidance execution portion that executes the selected merging support guidance.

26 Claims, 5 Drawing Sheets

NAVIGATION SYSTEM

INCORPORATION BY REFERENCE

The disclosure of Japanese Patent Application No. 2005-227783 filed on Aug. 5, 2005, including the specification, drawings and abstract is incorporated herein by reference in its entirety.

BACKGROUND OF THE INVENTION

1. Field of the Invention

The present invention relates to a navigation system.

2. Description of the Related Art

Conventionally, with a navigation unit that is mounted in a vehicle such as an automobile or the like, when the vehicle approaches an intersection or the like on the planned route, the navigation unit provides guidance by displaying arrows on a screen indicating going straight ahead, turning right, turning left, or the like, and/or by outputting the same information by voice. Also, a navigation unit has been proposed (e.g., Japanese Patent Application Publication No. JP-A-11-311535) that, when the vehicle enters an access road that will merge with the main thoroughfare of an expressway or the like, provides guidance regarding the merger with the main thoroughfare at which point the merging lane will end. A navigation unit has also been proposed that provides guidance for the access road segment (acceleration lane) that extends in advance of the point where the access road connects to the main thoroughfare and it becomes possible to change lanes into the main thoroughfare to the point where the acceleration lane ends, that is, information for the length of an acceleration lane. Because this allows the driver of the vehicle to know the length of the acceleration lane in advance, the driver can change lanes into the main thoroughfare safely and without worry.

However, in the conventional navigation unit, guidance information is provided only regarding the length of the acceleration lane, and not regarding the circumstances of other vehicles traveling on the main thoroughfare. Therefore, it is not possible for the driver who uses the navigation unit to judge whether or not the vehicle can safely change lanes, i.e. move from the acceleration lane to the main thoroughfare.

SUMMARY OF THE INVENTION

It is an object of the present invention to solve the problems of the conventional navigation unit so as to provide a navigation system that, when a host vehicle enters an acceleration lane that will merge with a main thoroughfare, provides guidance selected based on information about the host vehicle and information about other vehicles, so that the user can change lanes to enter the main thoroughfare, safely and without worry.

To achieve the foregoing object the present invention provides a navigation system which includes: a data storage section that stores map data; a current position detection section that detects a current position of a host vehicle; an acceleration lane remaining distance acquisition section that obtains the distance from the current position to the end of an acceleration lane that merges with a main thoroughfare, based on the map data and the current position of the host vehicle; a merging support guidance selection section that selects merging support guidance to support the merging of the host vehicle from the acceleration lane into the main thoroughfare, based on information about the host vehicle in the acceleration lane, information about another vehicle on the main thoroughfare which presents a potential problem in (potential obstacle to) merging, and the distance from the current position to the end of the acceleration lane; and a guidance execution section that executes the merging support guidance that was selected by the merging support guidance selection section.

According to the present invention, when the host vehicle enters the acceleration lane that merges with the main thoroughfare, the navigation system executes a type of merging support guidance that is selected based on information about the host vehicle and information about another vehicle of concern with regard to merging. Therefore, the user can change lanes into the main thoroughfare safely and without worry.

DETAILED DESCRIPTION OF THE PREFERRED EMBODIMENTS

An embodiment of the present invention will be explained in detail below with reference to the drawings.

Figure 1A:
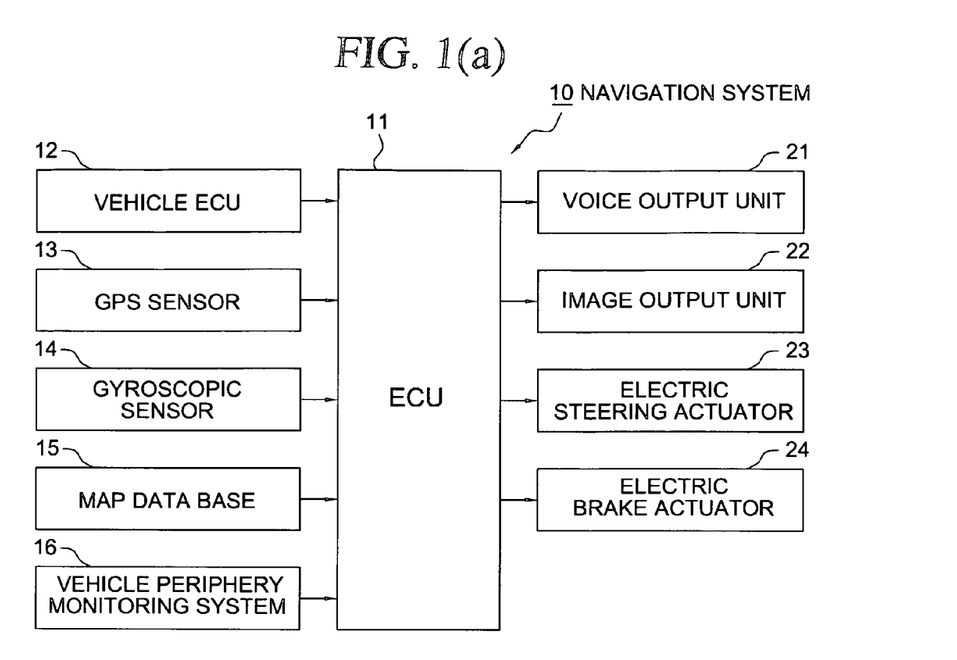
FIG. 1(a) is a block diagram of a navigation system in accordance with an embodiment of the present invention.
Figure 1B:
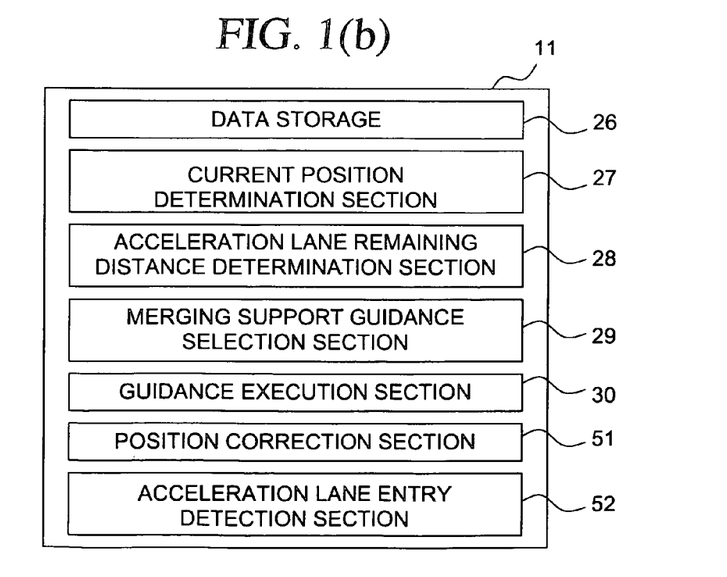
FIG. 1(b) is a block diagram of the ECU 11 of the navigation system of FIG. 1(a)

FIG. 1 shows a navigation system 10 according to the present embodiment as including an electronic control unit (ECU) 11 that is installed in a host vehicle and serves as a navigation control unit. The ECU 11 is a type of computer that is provided with a processor (computation means) such as a CPU, an MPU, or the like, and a memory, such as a semiconductor memory, magnetic disk, optical disk, or the like. Here, the host vehicle may be any type of vehicle capable of traveling on a road, such as a passenger car, a truck, a bus, a motorcycle, or the like, but in this embodiment, for ease of explanation, the host vehicle is described as a four-wheel passenger car driven by a driver who is the user of the navigation system 10.

The navigation system 10 also includes a vehicle ECU 12, a Global Positioning System (GPS) sensor 13, a gyroscopic sensor 14, a map database 15, and a vehicle periphery monitoring system 16, each of which is connected to the ECU 11.

The vehicle ECU 12 controls the various systems in the host vehicle 41, such as the engine, the transmission, the suspension, the brakes, the steering, and the like. The vehicle ECU 12 includes a processor such as a CPU, an MPU, or the like, and a memory, such as a semiconductor memory, a magnetic disk, an optical disk, or the like. The GPS sensor 13 is a receiving unit that receives GPS signals from GPS satellites. The gyroscopic sensor 14 is a detection unit that detects changes in the direction that the vehicle body is facing.

The map database 15 stores map data, which includes search data and the like stored in a memory such as a magnetic tape, a magnetic disk, a magnetic drum, a flash memory, a CD-ROM, an MD, a DVD-ROM, an optical disk, an MO, an IC card, an optical card, a memory card, or the like. The map database 15 is made up of various data files. In addition to search data for searching for routes, the map database 15 contains other types of data, such as facilities data and the like, that it uses to display guide maps along the planned route and other guidance information on an image output unit 22, described later. The map database 15 also contains various types of data used for voice output of specific information by a voice output unit 21, which is described later.

The vehicle periphery monitoring system 16 is a system that monitors the area around the host vehicle 41. The vehicle periphery monitoring system 16 includes cameras that are provided with image capture devices such as charge-coupled devices (CCDs), complementary metal oxide semiconductors (CMOSs), or the like and distance measurement sensors (range finders) such as ultrasonic sensors, laser sensors, millimeter-wave radars, or the like. The cameras and distance measurement sensors are arranged on the vehicle body to monitor the areas to the front, sides, rear, etc., of the host vehicle 41.

The ECU 11 detects the current position, the vehicle speed, the acceleration, the vehicle body orientation, and the like for the host vehicle 41, based on signals that the ECU 11 receives from the GPS sensor 13 and the gyroscopic sensor 14, as well as on signals the ECU 11 receives from the vehicle ECU 12 that represent the vehicle speed, the running distance, the accelerator angle, operation of the brake pedal by the driver, operation of the turn signal switch by the driver, movement of the transmission shift lever operated by the driver, and the like. Based on the detected current position, vehicle speed, acceleration, vehicle body orientation, and the like, the ECU 11 executes navigation routines, including route search, driving guidance, point of interest (POI) search, and the like. Route searching identifies a route to the set destination by referring to data stored in the map data base 15. Driving guidance is guidance for driving the planned route. POI searching locates local features and facilities. When the host vehicle 41 merges onto an expressway or the like, the ECU 11 executes a merging support routine based on information obtained by the vehicle periphery monitoring system 16, so that the user can operate the host vehicle 41 to merge easily and safely.

The navigation system 10 also includes the voice output unit 21, the image output unit 22, an electric steering actuator 23, and an electric brake actuator 24, each of which is connected to the ECU 11. Here, the voice output unit 21 includes a loudspeaker, a headphone, or the like and provides route guidance for the planned route and POI guidance by voice. The voice output unit 21 also provides merging support guidance by voice as a result of execution of merging support processing. The image output unit 22 is provided with a display, such as a CRT, a liquid crystal display, a light emitting diode (LED) display, a holography device, or the like, and provides route guidance, POI guidance, and merging support guidance by displaying images.

The electric steering actuator 23 is provided with an electric actuator such as a servomotor or the like and controls the steering angle to provide merging support guidance, for example, by imparting a tiny amount of vibration to the steering wheel. The electric brake actuator 24 is provided with an electric actuator such as a servomotor or the like and controls the operation of the brakes to provide merging support, such as by causing the host vehicle 41 to decelerate or stop.

Figure 2:
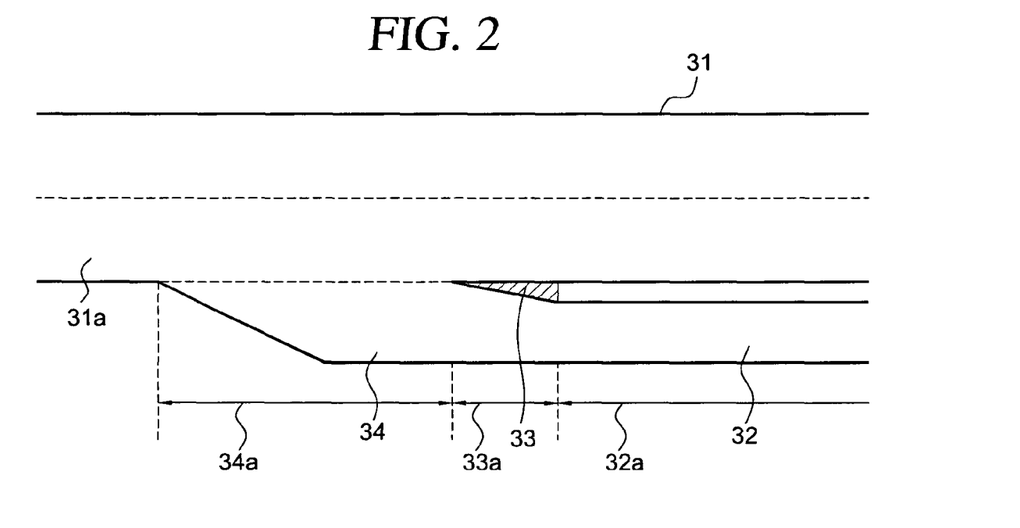
FIG. 2 is a plan view of an example of an acceleration lane that merges with a main thoroughfare.

In this embodiment, the navigation system 10 executes a merging support routine and provides merging support guidance when the host vehicle 41 enters an acceleration lane 34 from an access road 32 in order to merge into a main thoroughfare 31a of a destination road 31, as shown in FIG. 2.

In the example shown in FIG. 2, the destination road 31 is an inter-urban expressway, such as the Tomei Expressway, the Meishin Expressway, or the like, or an urban expressway established for a local area, such as the Tokyo, Hanshin, Nagoya, or Fukuoka-Kitakyushu regions, or a national expressway, a toll road, or the like, but it may also be an ordinary road. The access road 32 is a road that connects with the destination road 31 and is a lesser road than the destination road 31. The lesser road is normally an ordinary road, but it may also be a toll road or the like. Also, an entrance gate such as a toll gate or an electronic toll collection system (ETC) gate, may be present within the access road 32.

In the example shown in FIG. 2, the destination road 31 is a road with two lanes in each direction; however, only the lanes in the direction of vehicle travel are shown. The access road 32 is a one-way, one-lane road that connects to the left side of the destination road 31. For this reason, only the lanes on the left side of the destination road 31 are treated as the main thoroughfare 31a in the explanation of this embodiment which follows. When the destination road 31 is a road with three or more lanes on each side, only the leftmost lane is treated as the main thoroughfare 31a, and when the destination road 31 is a road with one lane on each side, that one lane is treated as the main thoroughfare 31a. Likewise, in a case where the access road 32 connects to the right side of the destination road 31, only the rightmost lane would be treated as the main thoroughfare 31a.

The access road 32 ends in the merging road segment where it merges with the destination road 31. The merging road segment is the road segment where the vehicle can change lanes from the access road 32 to the main thoroughfare 31a of the destination road 31 and is hereinafter referred to as an acceleration lane, e.g. acceleration lane 34. The acceleration lane 34 is a type of speed change lane, for example as specified in the Road Structure Ordinance, provided for the purpose of allowing motor vehicles to accelerate. Note that in FIG. 2, the reference numeral 34a denotes an acceleration zone.

A guide zone 33 is usually provided between the main thoroughfare 31a and the access road 32, and extends backward from the starting point of the acceleration lane 34 in the direction opposite to the direction of vehicle travel (to the right in FIG. 2). The guide zone 33 is specified by the Road Signs and Division Lines, and Road Markings Ordinance (commonly called the Signs Ordinance in Japan) and is an area that is generally a striped zone. The guide zone 33 at the point where the access road connects to the main thoroughfare 31a of the destination road 31 normally has a triangular shape. Note that in FIG. 2, the reference numeral 33a denotes a segment of the road coextensive with the guide zone. The reference numeral 32a denotes the access road zone, which extends to the end of the access road 32.

The map data includes a road data file which contains data pertaining to all roads, including narrow streets, e.g. all of the roads in an entire country. The road data file contains intersection data, node data, road data, traffic regulations data, and route display data. The intersection data includes the number of intersections for which data is stored, as well as data pertaining to individual intersections, and the data is stored with numbers assigned for the purpose of identification. The data pertaining to individual intersections includes data for the roads that connect to each intersection, that is, the number of connecting roads, and the data is stored with numbers assigned to identify the connecting roads individually. The intersection data may also include data on the type of intersection, that is, may include data that differentiates between an intersection that is equipped with traffic signal lights and an intersection that is not equipped with traffic signal lights. The node data is, at a minimum, made up of road locations and conformations that are included in the data recorded in a map data file, and consists of data for branching points (full intersections, T intersections, and the like), nodes, and links connecting each pair of nodes. At a minimum, the nodes show location of bends in the roads.

The road data file contains data on the number of roads for which data is stored, as well as data pertaining to individual roads, and the data is stored with numbers assigned for the purpose of identification. The data pertaining to individual roads include road classifications, distances that serve as the lengths of individual roads, travel times that serve as the times required to travel individual roads, and the like. The road classification indicates road type, such as national (federal) road, prefectural (or state) road, main regional road, ordinary road, expressway, or the like.

It is desirable for the road data to include data about the roads themselves, such as their widths, grades, cants, heights, banks, road surface conditions, presence or absence of medians, the number of lanes, points where the number of lanes decreases, points where the widths narrow, and the like. In the case of expressways and trunk roads, the road data for lanes in opposing directions are stored separately, so that the road is processed as a double road. For example, when a trunk road has two or more lanes on each side, it is processed as a double road, so that road data for the in-bound lanes and the out-bound lanes are stored as data for two independent roads. It is also desirable for the road data to include data for corners, such as the radii of curvature, full intersections, T intersections, corner entrances, and the like. For expressways and the like, the map database 15 also contains information about interchanges, and for each interchange, information about the access roads 32 that connect to the main thoroughfare 31a, the acceleration lanes 34 for merging with the main thoroughfare 31a, the guide zones 33, and the like. The map data file contains map information, such as nodes, links, coordinates, facility names, and the like used for drawing maps.

It is also desirable for the map data to include the map data file, a POI data file, and the like for drawing maps. The map data file contains data for drawing maps, such as nodes, links, coordinates, facility names, and the like. The POI data file contains facilities data, telephone directory data, event data, and the like for the purpose of searching for locations that will become departure points, destinations, points of passage, and the like.

In this embodiment, functionally, the navigation system 10 includes, in ECU 11, a data storage portion 23, a current position detection portion 27, an acceleration lane remaining distance acquisition portion 28, a merging support guidance selection portion 29, and a guidance execution portion 30. The data storage portion stores map data. The current position detection portion detects the current position of the host vehicle 41. The acceleration lane remaining distance acquisition portion obtains the distance from the current position to the end of the acceleration lane 34 where it merges with the main thoroughfare 31a, based on the map data and the current position of the host vehicle 41. The merging support guidance selection portion 29 selects the type of merging support guidance that will support the merging of the host vehicle 41 from the acceleration lane 34 into the main thoroughfare 31a The guidance execution portion 30 executes the merging support guidance selected by the merging support guidance selection portion 29. The ECU 11 also includes a position information correction portion 51, which corrects the current position of the host vehicle 41 based on information about the position of the guide zone 33 at the point where the acceleration lane 34 merges into the main thoroughfare 31a Next, operation of the navigation system 10 that is described above will be explained.

The overall operation will be explained, including the execution of merging support processing and the execution of merging support guidance.

Figure 3:
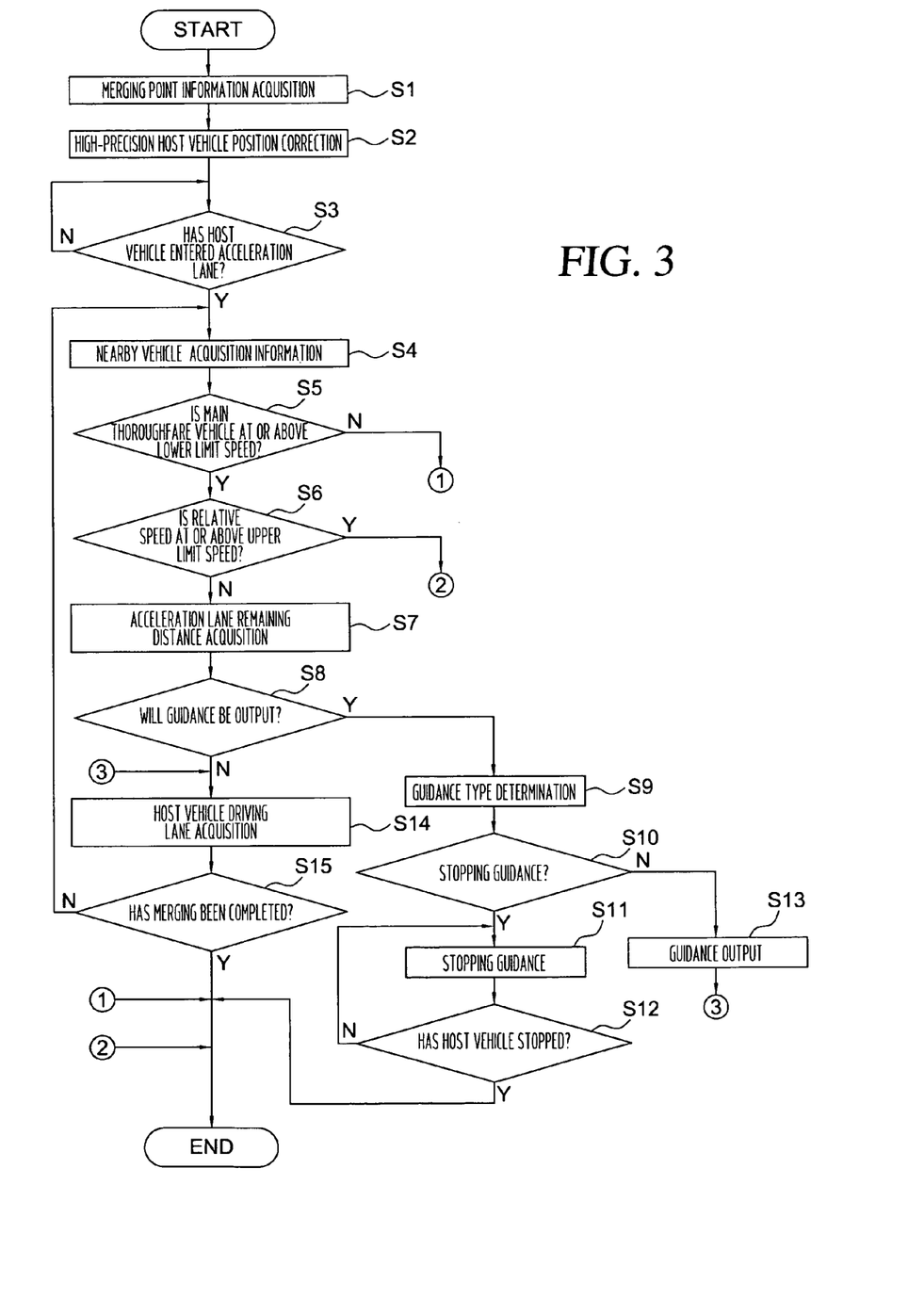
FIG. 3 is a flowchart of the operation of the navigation system in accordance with the embodiment of FIG. 1.

As shown in FIG. 3, the navigation system 10 starts merging support processing automatically when the current position of the host vehicle 41 enters the access road 32. However, in the alternative, the merging support processing may be started by the user's operation of a switch (not shown). Because the ECU 11 constantly detects the current position of the host vehicle 41, the navigation system 10 can judge when the current position of the host vehicle 41 has entered the access road 32 by referring to the map data that is stored in the map database 15. The system may judge that the access road 32 has been entered when the host vehicle 41 passes a toll gate that is situated within the access road 32, for example.

When the navigation system 10 starts merging support processing, it first obtains merging point information by referring to the map data that is stored in the map database 15 to specify the point where the access road 32 connects to the destination road 31, that is, the point at which the host vehicle 41 plans to merge, and to obtain geographic information regarding the merging point. Here, the geographic information that is obtained includes the direction in which the access road 32 connects to the destination road 31, that is, whether the direction of merging is to the left or right, the length of the acceleration lane section 34a, the length of the guide zone section 33a, the shape of the guide zone 33, and the like.

Next, the navigation system 10 executes high-precision host vehicle position correction. In this embodiment, the navigation system 10 uses the vehicle periphery monitoring system 16 for recognition of the positions of division lines and road markings that are painted on the road surface. The navigation system 10 uses position recognition to obtain the starting and ends of the guide zone 33 and their relative distances from the host vehicle 41, then corrects the current position of the host vehicle 41 based on location data for the guide zone 33 that is included in the map data, that is, information on the shape of the guide zone 33 and the absolute position of each vertex and information on the relative distances. For the recognition of the guide zone 33, it is desirable for the limits of a recognition area to be specified by the vehicle periphery monitoring system 16 based on the merging direction that is included in the geographic information for the merging point, and for recognition to be executed by means of pattern matching between the registered guide zone 33 and the division lines and road markings within the specified recognition area. This makes it possible to reduce the amount of processing required to recognize the guide zone 33.

Next, the navigation system 10, utilizing acceleration lane entry detection section 52, judges whether or not the host vehicle 41 has entered the acceleration lane 34. Here, the navigation system 10 makes the judgment based on whether or not the host vehicle 41 has passed the end of the guide zone 33 as obtained by high-precision host vehicle position correction. The navigation system 10 makes the judgment repeatedly until the host vehicle 41 has entered the acceleration lane 34. When the host vehicle 41 is judged to have passed the end of the guide zone 33 and entered the acceleration lane 34, the navigation system 10 executes nearby vehicle information acquisition. In this case, the vehicle periphery monitoring system 16 obtains the relative distance, the relative speed, and the relative acceleration, in relation to the host vehicle 41, of another vehicle that is in front, to the side, or in back of the host vehicle 41, which other vehicle is hereafter referred to as the other vehicle 42.

Next, the navigation system 10 judges whether or not the other vehicle 42 on the main thoroughfare is traveling at or above a lower limit speed, that is, whether or not the vehicle speed of the other vehicle 42 that is traveling on the main thoroughfare 31a is at or above the predetermined lower limit speed (for example, 30 km/h). If the other vehicle 42 is not traveling at or above the lower limit speed, processing ends. This is because of the fact that the vehicle speed of the other vehicle 42, being lower than the lower limit speed, means that the main thoroughfare 31a is congested, so merging support guidance is deemed to be unnecessary. However, when merging support guidance is deemed necessary because the vehicle speed on the main thoroughfare 31a is low, it is possible to omit the judgment of whether or not the vehicle on the main thoroughfare is traveling at or above the lower limit speed and to proceed with merging support guidance.

Next, the navigation system 10 judges whether or not the relative speed is at or above an upper limit speed, that is, whether or not the vehicle speed of the host vehicle 41 is higher than the vehicle speed of the other vehicle 42 that is traveling on the main thoroughfare 31a by an amount that is at or above the predetermined upper limit speed (for example, 10 km/h). If the relative speed is at or above the upper limit speed, the routine is ended because merging can be done easily when the host vehicle 41 is traveling at a speed sufficiently higher than the other vehicle on the main thoroughfare 31a and, therefore, merging is unnecessary. Here too, when merging support guidance is thought to be unnecessary because the host vehicle 41 is traveling at a speed sufficiently higher than the other vehicle 42 on the main thoroughfare 31a, it is possible to omit the judgment of whether or not the relative speed is at or above the upper limit speed and to proceed with the merging support guidance.

Next, the navigation system 10 determines the distance remaining in the acceleration lane by computing the length from the current position of the host vehicle 41 at the current time to the end of the acceleration lane 34, that is, the remaining length of the acceleration zone, the length of which was obtained as geographic information for the merging point, the end of the guide zone 33, which was obtained by high-precision host vehicle position correction, and the vehicle speed of the host vehicle 41. The running distance, the current position of the host vehicle 41, or the like may also be used instead of the vehicle speed of the host vehicle 41.

Next, the navigation system 10 determines whether or not to output merging support guidance. In this determination, the navigation system 10 judges whether or not the time until the host vehicle will arrive the end of the acceleration lane 34, that is, the remaining time, is less than or equal to a first predetermined (predetermined) time (for example, 4 seconds), based on the remaining length of the acceleration zone 34a, the vehicle speed of the host vehicle 41, and the acceleration of the host vehicle 41. If the remaining time is less than or equal to the first predetermined time, the decision is made to output guidance, and if the remaining time is greater than the first predetermined time, the decision is made not to output guidance. For example, a remaining time of 4 seconds means that if the vehicle speed of the host vehicle 41 is 60 km/h and the acceleration of the host vehicle 41 is 1.7 m/s$^2$, then the remaining length of the acceleration zone 34a is 80 meters.

If the decision is to output guidance, the navigation system 10 then decides the type of merging support guidance. The type of merging support guidance is decided based on the remaining length of the acceleration zone 34a, the position of the other vehicle 42 on the main thoroughfare 31a, the speed of the other vehicle 42, and the acceleration of the other vehicle 42. Three types of guidance are available: stopping guidance, guidance for entering the main thoroughfare 31a while accelerating, and guidance for entering the main thoroughfare 31a after allowing the other vehicle 42 to pass. The algorithm that determines the type of merging support guidance will be explained later. Next, the navigation system 10 determines whether or not the selected type of merging support guidance is stopping guidance. If stopping guidance, the navigation system 10 executes the stopping guidance routine. In stopping guidance, the navigation system 10 operates the electric steering actuator 23 so as to impart a tiny amount of vibration to the steering wheel, thereby providing a warning to the driver, and guiding the driver to stop the host vehicle 41. Guidance to stop the host vehicle 41 may also be provided by voice output from the voice output unit 21 and/or visually by display of images on the display unit 22. At the same time, the electric brake actuator 24 also applies the brakes automatically to decelerate the host vehicle 41 to a stop.

Next, the navigation system 10 judges whether or not the host vehicle 41 has stopped. The navigation system 10 repeatedly executes stopping guidance until it judges that the host vehicle 41 has stopped, at which time processing ends.

If the type of merging support guidance is determined not to be stopping guidance, the navigation system 10 outputs merging support guidance. If the type of merging support guidance is guidance for entering the main thoroughfare 31a while accelerating, the host vehicle 41 is guided to enter a space to the side while accelerating, this guidance being provided by voice that is output from the voice output unit 21 and/or by images output on display unit 22. On the other hand, if the type of merging support guidance is guidance for entering the main thoroughfare 31a after letting the other vehicle 42 pass, guidance to the effect that the host vehicle 41 should let the other vehicle 42 to the side or behind pass and then enter a space behind the other vehicle 42 is provided by a voice output from the voice output unit 21 and/or by images output via display unit 22.

Next, the navigation system 10 determines the host vehicle driving lane, i.e. executes host vehicle driving lane acquisition, even when the decision was not to output guidance. As described earlier, the navigation system 10 uses the vehicle periphery monitoring system 16 for recognition of the positions division lines and road markings that are painted on the road surface, and thereby recognizes the lane in which the host vehicle 41 is traveling, based on the division lines and road markings.

The navigation system 10 also judges whether or not merging has been completed based on the results of host vehicle driving lane acquisition. More specifically, the navigation system 10 judges whether or not the host vehicle 41 has crossed over the division line that divides the main thoroughfare 31a and the acceleration lane 34. If the host vehicle 41 has crossed over the division line and entered the main thoroughfare 31a, merging is judged to have been completed and processing ends. On the other hand, if merging has not been completed, the navigation system 10 executes nearby vehicle information acquisition once more and repeats the routine described above.

Next, the flowchart of FIG. 3 will be explained.

At step S1, the system acquires merging point information.

At step S2, the system executes high-precision host vehicle position correction.

At step S3, the system judges whether or not the host vehicle 41 has entered the acceleration lane 34. If the host vehicle 41 has entered the acceleration lane 34, control proceeds to step S4. If the host vehicle 41 has not entered the acceleration lane 34, the judgment process is repeated until the host vehicle 41 has entered the acceleration lane 34.

At step S4, the system acquires nearby vehicle information.

At step S5, the system judges whether or not a vehicle on the main thoroughfare is traveling at or above the lower limit speed. If the vehicle on the main thoroughfare is traveling at or above the lower limit speed, control proceeds to step S6. If the vehicle on the main thoroughfare is not traveling at or above the lower limit speed, processing ends.

At step S6, the system judges whether or not the relative speed is at or above the upper limit speed. If the relative speed is at or above the upper limit speed, processing ends. If the relative speed is not at or above the upper limit speed, control passes to step S7.

At step S7, the system determines the remaining distance in the acceleration lane.

At step S8, the system determines whether or not to output guidance. If guidance is to be output, control proceeds to step S9. If guidance will not be output, the routine goes to step S14.

At step S9, the system selects the type of merging support guidance.

At step S10, the system determines whether or not the type of merging support guidance that was selected is stopping guidance. If the type of merging support guidance that was selected is stopping guidance, control proceeds to step S11. If the type of merging support guidance that was selected is not stopping guidance, control proceeds to step S13.

At step S11, the system executes stopping guidance.

At step S12, the system judges whether or not the host vehicle 41 has stopped. If the host vehicle 41 has stopped, processing ends. If the host vehicle 41 has not stopped, control returns to step S11.

At step S13, the system outputs merging support guidance.

At step S14, the system determines the host vehicle driving lane.

At step S15, the system judges whether or not merging has been completed. If merging has been completed, processing ends. If merging has not been completed, control returns to step S4.

Figure 4A:
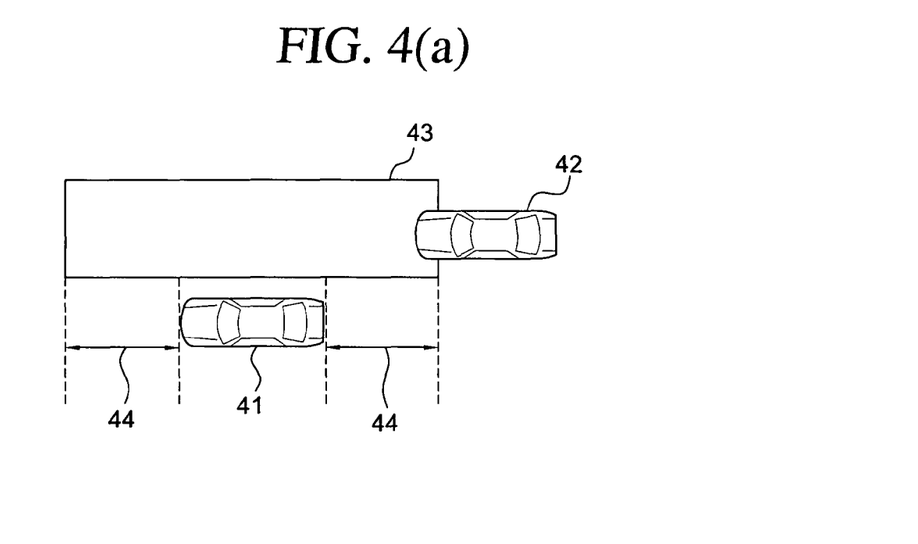
FIG. 4 is a drawing showing the relationship between positions of a host vehicle and another vehicle which is of concern in merging in accordance with an embodiment to the present invention.
Figure 4B:
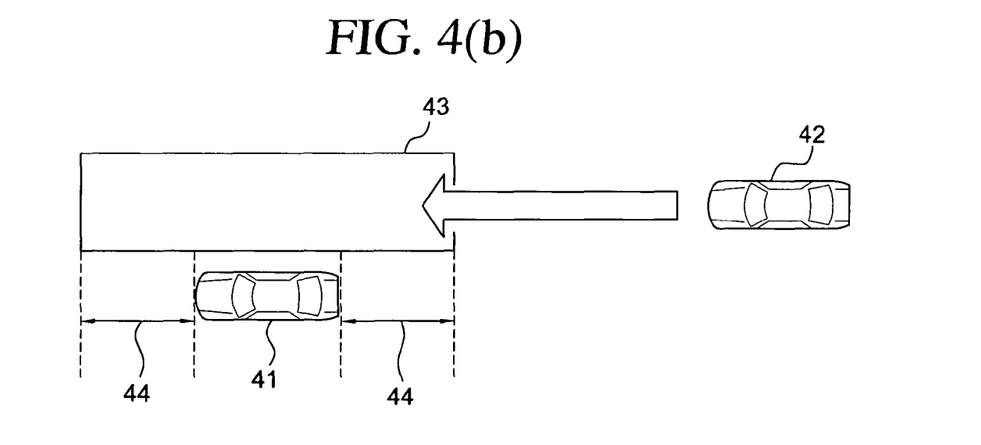

Next, the algorithm that selects the type of merging support guidance will be explained with reference to FIGS. 4 and 5.

First, the navigation system 10 determines whether or not the time remaining until the host vehicle will arrive at the end of the acceleration lane 34 is less than or equal to a second predetermined time (for example, 2 seconds), based on the remaining length of the acceleration lane zone 34a, the vehicle speed of the host vehicle 41, and the acceleration of the host vehicle 41. Note that the second predetermined time serves as a standard for judging whether or not to provide guidance to stop the host vehicle 41, and it is set to be shorter than the first predetermined time, which is used to determine whether or not to output guidance. For example, a remaining time of 1 second means that if the vehicle speed of the host vehicle 41 is 60 km/h and the acceleration of the host vehicle 41 is 1.7 m/s$^2$, then the remaining length of the acceleration lane 34 is 36.6 meters.

If the time remaining to the end of the acceleration lane 34 is less than or equal to the second predetermined time, the navigation system 10 determines whether or not there is a vehicle in a space on the main thoroughfare to the side of the host vehicle traveling in the acceleration lane, i.e. sideward space 43. The length of the sideward space 43 is equal to the length of the host vehicle 41 plus a fixed distance 44 (for example, 2 meters) to the front and rear of the host vehicle 41. If any part of the other vehicle 42 that is traveling on the main thoroughfare 31a has entered the sideward space 43, as shown in FIG. 4A, the navigation system 10 determines that there is a vehicle on the main thoroughfare in the sideward space 43.

When there is a vehicle on the main thoroughfare in the sideward space 43, the navigation system 10 selects stopping guidance as the type of merging support guidance. In other words, when the time until the host vehicle will arrive the end of the acceleration lane 34 is less than or equal to the second predetermined time and the other vehicle 42 that is traveling on the main thoroughfare 31a has entered the sideward space 43, the navigation system 10 executes stopping guidance. When there is no vehicle on the main thoroughfare in the sideward space 43, the navigation system 10 determines whether or not there is a vehicle on the main thoroughfare that will enter the sideward space 43 within a third predetermined time (for example, 2 seconds). The third predetermined time is set separately from the first predetermined time and the second predetermined time.

If there is a vehicle on the main thoroughfare that will enter the sideward space 43 within the third predetermined time, the navigation system 10 selects stopping guidance as the type of merging support guidance. In other words, when the time until the host vehicle will arrive at the end of the acceleration lane 34 is less than or equal to the second predetermined time, then if the other vehicle 42 will enter the sideward space 43 within the third predetermined time, the navigation system 10 executes stopping guidance, even if the other vehicle 42 that is traveling on the main thoroughfare 31a has not yet entered the sideward space 43.

If there is no vehicle on the main thoroughfare that will enter the sideward space 43 within the third predetermined time, the navigation system 10 selects guidance for entering the main thoroughfare 31a while accelerating as the type of merging support guidance. In other words, when the time until the host vehicle will arrive at the end of the acceleration lane 34 is less than or equal to the second predetermined time, and the other vehicle 42 that is traveling on the main thoroughfare 31a has not entered and will not enter the sideward space 43 within the third predetermined time, the navigation system 10 provides guidance for entering the main thoroughfare 31 a while accelerating. For example, that the other vehicle 42 will not enter the sideward space 43 within 2 seconds means that if the vehicle speed of the other vehicle 42 is 10 km/h higher than the vehicle speed of the host vehicle 41 and the acceleration of the host vehicle 41 is 1.7 m/s$^2$, then the other vehicle 42 is at least 9 meters behind the rear edge of the sideward space 43.

On the other hand, even if the time until the host vehicle will arrive at the end of the acceleration lane 34 is greater than the second predetermined time, the navigation system 10 then determines whether or not there is a vehicle on the main thoroughfare in the sideward space 43. When there is a vehicle on the main thoroughfare in the sideward space 43, the navigation system 10 determines whether or not the acceleration of the vehicle on the main thoroughfare is positive.

If the acceleration of the vehicle on the main thoroughfare is positive, the navigation system 10 selects guidance for entering the main thoroughfare 31a after letting the other vehicle 42 pass as the type of merging support guidance.

When the acceleration of the vehicle on the main thoroughfare is not positive, the navigation system 10 determines whether or not the relative speed is positive, that is, whether or not the vehicle speed of the other vehicle 42 is greater than the vehicle speed of the host vehicle 41. When the relative speed is positive, the navigation system 10 selects guidance for entering the main thoroughfare 31a after letting the other vehicle 42 pass as the type of merging support guidance. In other words, if the time until the host vehicle will arrive the end of the acceleration lane 34 is greater than the second predetermined time, and the other vehicle 42 that is traveling on the main thoroughfare 31a has entered the sideward space 43, and the vehicle speed of the other vehicle 42 is greater than the vehicle speed of the host vehicle 41, even though the other vehicle 42 in the sideward space 43 is decelerating, the other vehicle 42 will exit the sideward space 43, and accordingly, navigation system 10 provides guidance for entering the main thoroughfare 31a after letting the other vehicle 42 pass. When the relative speed is not positive, the navigation system 10 selects guidance for entering the main thoroughfare 31a by accelerating as the type of merging support guidance.

If the time until the host vehicle will arrive the end of the acceleration lane 34 is greater than the second predetermined time and there is no vehicle on the main thoroughfare in the sideward space 43, the navigation system 10 determines whether or not there is a vehicle on the main thoroughfare that will enter the sideward space 43 within the third predetermined time. If there is a vehicle on the main thoroughfare that will enter the sideward space 43 within the third predetermined time, the navigation system 10 selects guidance for entering the main thoroughfare 31 a after letting the other vehicle 42 pass as the type of merging support guidance. In other words, even if the time until the host vehicle will arrive at the end of the acceleration lane 34 is greater than the second predetermined time, and the other vehicle 42 that is traveling on the main thoroughfare 31a has not entered the sideward space 43, if the other vehicle 42 that is traveling on the main thoroughfare 31a will enter the sideward space 43 within the third predetermined time, the navigation system 10 provides guidance for entering the main thoroughfare 31a after letting the other vehicle 42 pass. When there is no vehicle on the main thoroughfare that will enter the sideward space 43 within the third predetermined time, the navigation system 10 selects guidance for entering the main thoroughfare 31a by accelerating as the type of merging support guidance.

Figure 5:
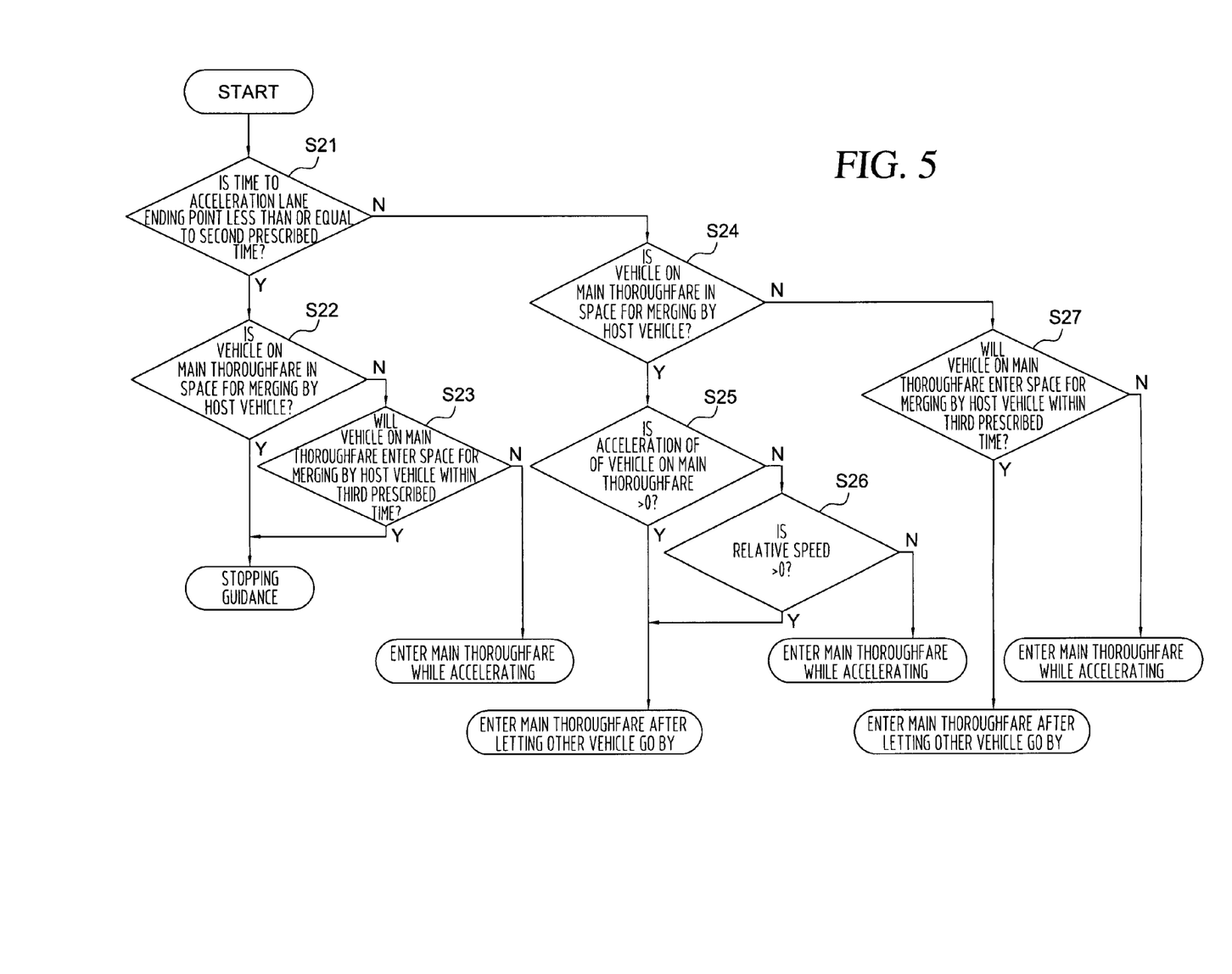
FIG. 5 is a flowchart of an algorithm that determines the type of merging support guidance in accordance with the embodiment of FIGS. 1 and 3.

In the flowchart of FIG. 5, at step S21, the system determines whether or not the time until the host vehicle will arrive the end of the acceleration lane 34 is less than or equal to the second predetermined time. If the time until the host vehicle will arrive at the end of the acceleration lane 34 is less than or equal to the second predetermined time, control proceeds to step S22. If the time until the host vehicle will arrive the end of the acceleration lane 34 is greater than the second predetermined time, control proceeds to step S24.

At step S22, the system determines whether or not there is a vehicle on the main thoroughfare in the sideward space 43. If there is a vehicle on the main thoroughfare in the sideward space 43, stopping guidance is executed. If there is no vehicle on the main thoroughfare in the sideward space 43, control proceeds to step S23.

At step S23, the system determines whether or not there is a vehicle on the main thoroughfare that will enter the sideward space 43 within the third predetermined time. If there is a vehicle on the main thoroughfare that will enter the sideward space 43 within the third predetermined time, stopping guidance is executed. If there is no vehicle on the main thoroughfare that will enter the sideward space 43 within the third predetermined time, guidance for entering the main thoroughfare 31a by accelerating is executed.

At step S24, the system determines whether or not there is a vehicle on the main thoroughfare in the sideward space 43. If there is a vehicle on the main thoroughfare in the sideward space 43, control proceeds to step S25. If there is no vehicle on the main thoroughfare in the sideward space 43, control proceeds to step S27.

At step S25, the system determines whether or not the acceleration of the vehicle on the main thoroughfare is positive. If the acceleration of the vehicle on the main thoroughfare is positive, guidance for entering the main thoroughfare 31a after letting the other vehicle 42 pass by is executed. If the acceleration of the vehicle on the main thoroughfare is not positive, control proceeds to step S26.

At step S26, the system determines whether or not the relative speed is positive. If the relative speed is positive, guidance for entering the main thoroughfare 31a after letting the other vehicle 42 pass is executed. If the relative speed is not positive, guidance for entering the main thoroughfare 31a by accelerating is executed.

At step S27, the system determines whether or not there is a vehicle on the main thoroughfare that will enter the sideward space 43 within the third predetermined time. If there is a vehicle on the main thoroughfare that will enter the sideward space 43 within the third predetermined time, guidance for entering the main thoroughfare 31a after letting the other vehicle 42 pass is executed. If there is no vehicle on the main thoroughfare that will enter the sideward space 43 within the third predetermined time, guidance for entering the main thoroughfare 31a by accelerating is executed.

In this manner, in this embodiment, when the host vehicle 41 enters the acceleration lane 34 that merges with the main thoroughfare 31a, the navigation system 10 selects the type of merging support guidance based on information such as the position, vehicle speed, acceleration, and the like of the host vehicle 41 and information such as the position, vehicle speed, acceleration, and the like of the other vehicle 42, and then selects the type of guidance. Note that there are three types of merging support guidance: stopping guidance, guidance for entering the main thoroughfare 31a while accelerating, and guidance for entering the main thoroughfare 31a after letting the other vehicle 42 pass. Therefore, by following the merging support guidance, the user can easily and safely merge into the main thoroughfare 31a.

Also, because merging support guidance is executed using the end of the acceleration lane zone 34a as a reference point, accurate merging support guidance can be provided. In this case, because judgments are made using the remaining length of the acceleration lane zone 34a, the time until the host vehicle will arrive at the end of the acceleration lane 34, and the like, it is possible to select the appropriate type of merging support guidance and to execute merging support guidance with appropriate timing.

Specifically, when the time until the host vehicle 41 will arrive at the end of the acceleration lane 34 is less than or equal to the predetermined time, and the other vehicle 42 on the main thoroughfare 31a is in or will enter the sideward space 43 to the side of the host vehicle 41, stopping guidance is executed. When stopping guidance is executed, the brakes are applied automatically and the host vehicle 41 is decelerated to a stop, so danger can be effectively avoided. When the other vehicle 42 on the main thoroughfare 31 a is not in and will not enter the sideward space 43, guidance for entering the main thoroughfare 31a while accelerating is provided. When the time until the host vehicle 41 will arrive at the end of the acceleration lane 34 is greater than the predetermined time, and the other vehicle 42 on the main thoroughfare 31a will enter or exit the sideward space 43, guidance for entering the main thoroughfare 31a after letting the other vehicle 42 pass is provided. Therefore, by following the merging support guidance, the nature of which is matched with the circumstances, the user can easily and safely merge into the main thoroughfare 31a.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A navigation system for providing a host vehicle with guidance for merging into a main thoroughfare from an access road, through an acceleration lane, the navigation system comprising:
   (a) a computer-readable data storage portion containing map data including location data for location of a guide zone located between an end portion of the access road and the main thoroughfare, the guide zone having an end where the access road ends and the acceleration lane begins;
   (b) a current position detection portion that detects a current position of the a host vehicle;
   (c) a vehicle periphery monitoring portion, including an image capture device, for capturing an image of a vicinity of the host vehicle, for recognizing the guide zone in a captured image and for recognizing a vehicle traveling on the main thoroughfare in a captured image;
   (d) a position information correction portion that corrects the detected current position of the host vehicle based on the location data for the recognized guide zone;
   (e) an acceleration lane entry detection portion that judges whether or not the corrected current position of the host vehicle has passed the end of the guide zone and entered the acceleration lane; and
   (f) a guidance execution portion that, responsive to a judgment that the corrected current position of the host vehicle has passed the end of the guide zone and entered the acceleration lane, executes merging support guidance to guide the driver in merging of the host vehicle from the acceleration lane into the main thoroughfare, based on the corrected current position of the host vehicle and on information for the recognized vehicle.

2. The navigation system according to claim 1, wherein the merging support guidance includes one of stopping guidance, guidance for entering the main thoroughfare while accelerating, and guidance for entering the main thoroughfare after letting the recognized vehicle on the main thoroughfare pass.

3. The navigation system according to claim 2, wherein stopping guidance is selected when the time until the host vehicle will arrive at the end of the acceleration lane is less than or equal to a predetermined time, and the recognized vehicle on the main thoroughfare is in or will enter a space to the side of the host vehicle within the predetermined time.

4. The navigation system according to claim 3, wherein the guidance execution portion controls the brakes to stop the host vehicle when the selected merging support guidance is stopping guidance.

5. The navigation system according to claim 2, wherein guidance for entering the main thoroughfare while accelerating is selected when the recognized vehicle on the main thoroughfare is not in and will not enter a space to the side of the host vehicle within a predetermined time.

6. The navigation system according to claim 2, wherein -guidance for entering the main thoroughfare after letting the recognized vehicle on the main thoroughfare pass is selected when the time until the host vehicle will arrive at the end of the acceleration lane is greater than a predetermined time, and the recognized vehicle on the main thoroughfare will enter or exit a space to the side of the host vehicle within the predetermined time.

7. The navigation system according to claim 1, wherein the guidance zone is a stripped area of road surface.

8. The navigation system according to claim 1 wherein the guide zone extends in the direction of travel between the access road and the main thoroughfare, to a vertex where the access road ends and the acceleration lane begins.

9. The navigation system according to claim 8 wherein the guide zone is triangular in shape.

10. The navigation system according to claim 1 additionally comprising:
   (g) an acceleration lane remaining distance acquisition portion that determines a distance from the corrected current position to the end of an acceleration lane where it merges with a main thoroughfare, based on the map data and the corrected current position of the host vehicle; and
   (h) a merging support guidance selection portion that selects a type of merging support guidance that will support the merging of the host vehicle from the acceleration lane into the main thoroughfare, based on information for the host vehicle in the acceleration lane, the acquired information for the recognized vehicle on the main thoroughfare, and the determined distance from the corrected current position to the end of the acceleration lane.

11. The navigation system according to claim 10, wherein the information for the host vehicle in the acceleration lane includes the vehicle speed of the host vehicle and the acceleration of the host vehicle, and the information for the recognized vehicle on the main thoroughfare includes the relative distance of the recognized vehicle on the main thoroughfare from the host vehicle, the relative vehicle speed of the recognized vehicle on the main thoroughfare in relation to the host vehicle, and the relative acceleration of the recognized vehicle on the main thoroughfare in relation to the host vehicle.

12. The navigation system according to claim 1, wherein the acquired information for the vehicle on the main thoroughfare includes the relative distance from the host vehicle, relative vehicle speed in relation to the host vehicle, and relative acceleration in relation to the host vehicle.

13. The navigation system according to claim 1 wherein the vehicle periphery monitoring portion, responsive to a judgment that the corrected current position of the host vehicle has passed the end of the guide zone and entered the acceleration lane, initiates nearby vehicle information acquisition to recognize a vehicle traveling on the main thoroughfare in a captured image and to obtain the information for the recognized vehicle.

14. The navigation system according to claim 1 wherein the vehicle periphery monitoring portion recognizes the guide zone in a captured image by pattern matching of features in the captured image with the location data.

15. A navigation method for providing a host vehicle with guidance for merging into a main thoroughfare from an access road, through an acceleration lane, comprising:
   (a) determining the current position of the host vehicle;
   (b) capturing an image of a vicinity of the host vehicle;

(c) recognizing, in the captured image, a guide zone located between an end portion of the access road and the main thoroughfare, the guide zone having an end where the access road ends and the acceleration lane begins;

(d) obtaining, from a computer-readable database, location data for location of the recognized guide zone;

(e) correcting the determined current position of the host vehicle based on the location data for the recognized guide zone;

(f) judging whether or not the corrected current position of the host vehicle has passed the end of the guide zone and entered the acceleration lane; and (g) outputting merging support guidance, responsive to a judgment that the corrected current position of the host vehicle has passed the end of the guide zone and entered the acceleration lane, to guide the driver in merging of the host vehicle from the acceleration lane into the main thoroughfare, based on the corrected current position of the host vehicle and on the acquired information for the recognized vehicle.

16. The navigation method according to claim 15, wherein the acquired information for the recognized vehicle on the main thoroughfare includes the relative distance from the host vehicle, relative vehicle speed in relation to the host vehicle, and relative acceleration in relation to the host vehicle.

17. The navigation method according to claim 15 wherein the merging support guidance is selected from stopping guidance, guidance for entering the main thoroughfare with acceleration and guidance for entering the main thoroughfare after letting the recognized vehicle on the main thoroughfare pass.

18. The navigation method according to claim 17 wherein stopping guidance is selected when the time until the host vehicle will arrive at the end of the acceleration lane is less than or equal to a predetermined time, and the recognized vehicle on the main thoroughfare is in or will enter a space to the side of the host vehicle within the predetermined time.

19. The navigation method according to claim 18 further comprising automatically controlling brakes of the host vehicle to bring the host vehicle to a stop.

20. The navigation method according to claim 17 wherein guidance for entering the main thoroughfare with acceleration is selected when the recognized vehicle on the main thoroughfare is not in and will not enter a predetermined space to the side of the host vehicle within a predetermined time.

21. The navigation method according to claim 17 wherein guidance for entering the main thoroughfare after letting the recognized vehicle on the main thoroughfare pass is selected when the time until the host vehicle will arrive at the end of the acceleration lane is greater than a predetermined time, and the recognized vehicle on the main thoroughfare will enter or exit a space to the side of the host vehicle within the predetermined time.

22. The navigation method according to claim 15 wherein the guidance zone is a stripped area of road surface.

23. The navigation method according to claim 15 wherein the guide zone extends in the direction of travel between the access road and the main thoroughfare, to a vertex where the access road ends and the acceleration lane begins.

24. The navigation method according to claim 15 wherein the guide zone is triangular in shape.

25. The navigation method according to claim 15 additionally comprising:

(h) determining a distance from the corrected current position to the end of an acceleration lane where it merges with a main thoroughfare, based on the map data and the corrected current position of the host vehicle; and (i) selects a type of merging support guidance that will support the merging of the host vehicle from the acceleration lane into the main thoroughfare, based on information for the host vehicle in the acceleration lane, information for the recognized vehicle on the main thoroughfare, and the determined distance from the corrected current position to the end of the acceleration lane.

26. A navigation system for providing a host vehicle with guidance for merging into a main thoroughfare from an access road, through an acceleration lane, the navigation system comprising:

image determination means for determining the current position of the host vehicle;

image capture means for capturing an image of a vicinity of the host vehicle;

image recognition means for recognizing, in the captured image, a guide zone located between an end portion of the access road and the main thoroughfare, the guide zone having an end where the access road ends and the acceleration lane begins;

means for obtaining, from a computer-readable database, location data for location of the recognized guide zone;

means for correcting the determined current position of the host vehicle based on the location data for the recognized guide zone;

means for judging whether or not the corrected current position of the host vehicle has passed the end of the guide zone and entered the acceleration lane; and means for outputting merging support guidance, responsive to a judgment that the corrected current position of the host vehicle has passed the end of the guide zone and entered the acceleration lane, to guide the driver in merging of the host vehicle from the acceleration lane into the main thoroughfare, based on the corrected current position of the host vehicle and on information for the recognized vehicle.

* * * * *